(No Model.)  2 Sheets—Sheet 1.
W. E. H. SEARCY.
CONVERTIBLE SEED OR FERTILIZER DISTRIBUTER.
No. 502,892. Patented Aug. 8, 1893.
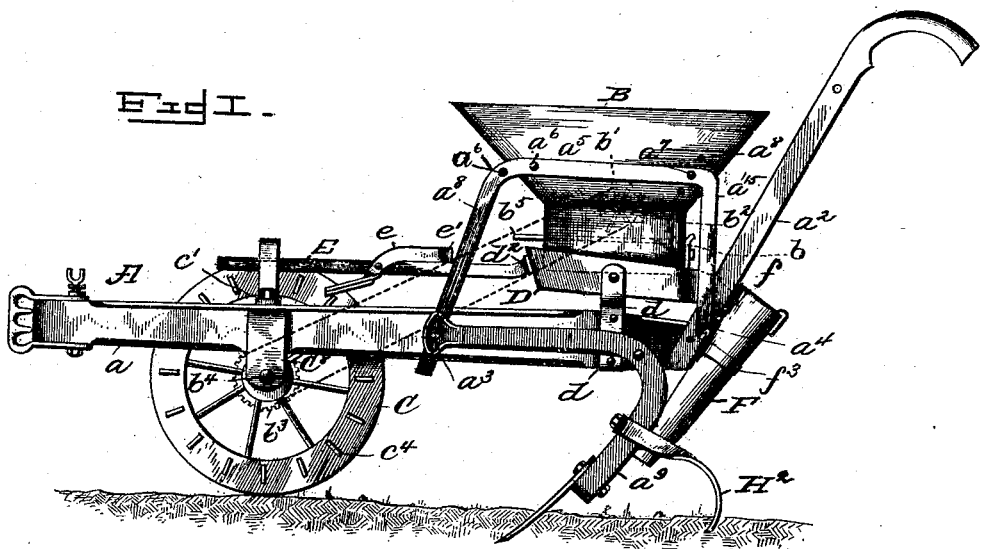
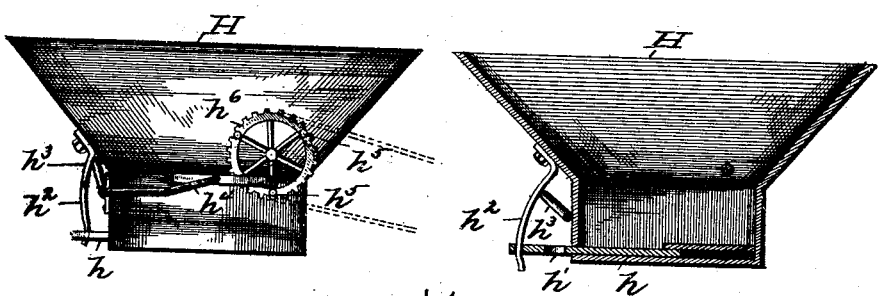
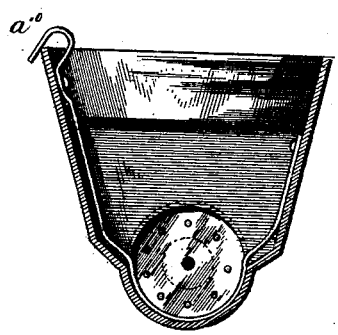
Witnesses
W. M. Hale
W. W. Anlick
Inventor:
William E. H. Searcy
by  
his Attorney (No Model.) 2 Sheets—Sheet 2.

W. E. H. SEARCY.
CONVERTIBLE SEED OR FERTILIZER DISTRIBUTER.

No. 502,892. Patented Aug. 8, 1893.

Witnesses
W. McNae
W. W. Aulick

Inventor:
William E. H. Searcy,
by Paul W. Strauss
his Attorney.

UNITED STATES PATENT OFFICE.

WILLIAM EVERARD HAMILTON SEARCY, OF GRIFFIN, GEORGIA.

CONVERTIBLE SEED OR FERTILIZER DISTRIBUTER.

SPECIFICATION forming part of Letters Patent No. 502,892, dated August 8, 1893.

Application filed October 19, 1892. Serial No. 449,390. (No model.)

*To all whom it may concern:*

Be it known that I, WILLIAM EVERARD HAMILTON SEARCY, a citizen of the United States, residing at Griffin, in the county of Spalding and State of Georgia, have invented certain new and useful Improvements in a Combined Seed and Fertilizer Distributer; and I do hereby declare the following to be a full, clear, and exact description of the invention, such as will enable others skilled in the art to which it appertains to make and use the same.

This invention relates to an improvement in a convertible seed sower and fertilizer distributer. It relates particularly to that class of machines wherein a hopper, containing suitable agitators or seed-dropping mechanism, is mounted in a supplemental frame secured upon a plow frame of any ordinary construction, and means whereby the agitators or seed-dropping mechanism is operated by the motion of the machine.

It further consists of a hopper having suitable agitators or seed-dropping mechanism, mounted in a supplemental frame secured upon a plow frame of any ordinary construction, of a shoe arranged beneath the hopper, and means whereby the agitator or the seed-dropping mechanism is moved or revolved and the shoe is given a vertical reciprocating movement by the motion of the machine, through a knocker-iron and driving-wheel adjustably secured upon the plow beam; and furthermore the invention consists in means whereby the seed or fertilizer is scattered after leaving the shoe, during its descent to the ground; and finally it consists in the novel arrangement of the details of construction whereby the objects of the invention are accomplished.

Figure 5:
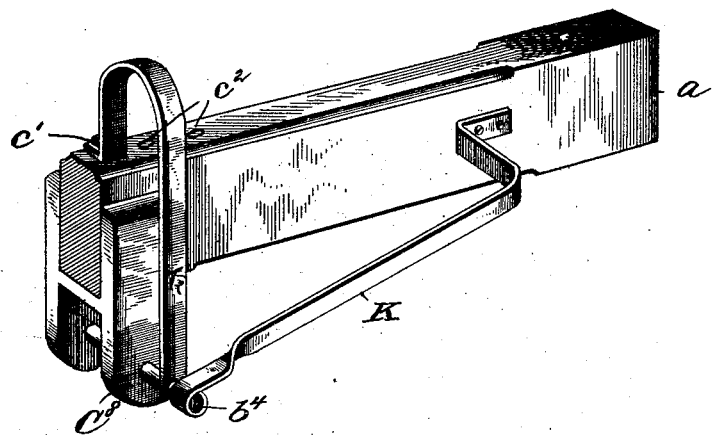
Figure 6:
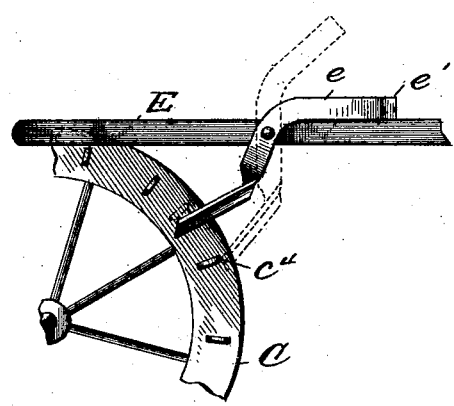
Figure 7:
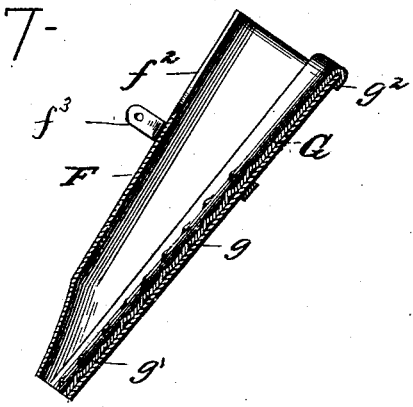
Figure 8:

In the accompanying drawings forming a part of this specification and in which like letters of reference indicate corresponding parts: Figure 1 is a side elevation of the invention. Fig. 2 is a side elevation of a modified form of hopper and its automatic seed-dropping mechanism. Fig. 3 is a vertical sectional view thereof. Fig. 4 is a vertical sectional view of another modified form of hopper. Fig. 5 is a detail perspective view of the forward end of the plow-beam showing the means for journaling the driving-wheel. Fig. 6 is an enlarged detail view of a part of the driving-wheel and the knocker-iron, its operation when the movement of the driving-wheel is reversed being shown in dotted lines. Fig. 7 is a vertical sectional view of the seed-chute showing the removable plate for separating the seed, and Fig. 8 is a detail plan view of the knocker-iron and its angle-bar.

In the drawings, A represents a plow of ordinary construction, $a$ the plow beam and $a^2$ the handles. Secured to the plow beam at $a^3$ and $a^4$ by means of bolts is a supplemental frame $a^5$ composed of two parallel bars $a^{15}$.

B is a hopper secured to the supplemental frame $a^5$ by means of bolts $a^6$ $a^7$ at the forward and rear ends of the hopper, the bolt $a^7$ being designed to engage one of a series of holes $a^8$ in the hopper, thus providing means whereby one end of the hopper may be elevated or lowered to increase or diminish the flow of seed therefrom. In the bottom or side of the hopper indicated by an arrow, in dotted lines, is an outflow opening $b$ regulated by a horizontal slide $b^5$. Journaled in the sides of the hopper is an agitator $b'$, on one end of the shaft of which is a sprocket-wheel $b^2$, shown in dotted lines connected by means of a belt or chain to a similar wheel $b^3$ integral with the driving wheel C.

C is a driving-wheel having its shaft $b^4$ journaled in the lower end of an approximately H-shaped clamp $C^3$, which fits on the underside of the plow-beam and bears against the sides thereof. This clamp is adjustably secured to the beam $a$ by means of a bolt $c'$ passing through one of a series of bolt-holes $c^2$ in the plow-beam. By this arrangement the belt or chain connecting the driving-wheel with the agitating mechanism may be tightened or loosened, and thereby the motion of the agitator may be increased or diminished respectively. The driving-wheel C has secured thereto or formed integral therewith, a series of projections or ribs $c^4$ equidistantly spaced and arranged parallel with the periphery thereof, the purpose of which will presently appear.

K is a shield or guard for the driving-wheel C, pivoted at one end to the forward end of the plow-beam $a$ and receiving the end of the driving-wheel shaft in its other end.

Arranged below the hopper B is a shoe D, which may be pivoted to the hopper or to an upright $d$ supported on the plow-beam, as shown, the relative position of this shoe being obliquely disposed with regard to the bottom of the hopper, its rear end being open and extending back of the plow-beam $a$. Secured to the inner or forward end of the shoe D at $d^2$ is a knocker-iron, or bar E. This knocker iron has pivoted near its forward end a supplemental piece or angle-bar $e$ which is limited in its upward movement by an offset or bent portion $e'$ thereof engaging the top of the knocker-iron, and held normally in engagement therewith by means of the projections or ribs on the driving wheel. This supplemental piece or bar $e$ is designed to engage successively the pins or ribs $c^4$ on the driving wheel C as it is revolved forward thus imparting to the shoe D a vertically reciprocating movement which shakes the seed therein into the seed chute F. In turning the wheel to the rear the pivoted angle-bar $e$ drops down and hence out of engagement with the projections or ribs on the driving wheel and thus ceases to operate the shoe until the forward movement is begun again, thus preventing the waste of the seed or dropping them in turning at the end of a row by throwing the angle-bar $e$ out of engagement with the ribs or flanges on the driving-wheel while the plow is being drawn backward, which motion is customary in turning at the end of a furrow.

F is a seed-chute arranged in the rear of the plow beam $a$ and is secured thereto at $f$ by means of a ring encircling the chute and having its ends secured to the plow beam. This chute receives the rear end of the shoe D in a slot $f^2$ therein.

G is a plate semi-circular in cross section and conforming to the contour of the seed chute F. Formed on the plate G, at $g$ is a series of projections or corrugations $g'$ for scattering the seed in their descent through the chute to the ground. This plate is secured in the chute F by means of a lip $g^2$ at its upper end, turned at right angles and parallel thereto, the recess formed by said lip being designed to receive the upper edge of the seed chute thus allowing the plate G to be readily attached or removed therefrom when desirable. There may also be a crease or indentation in the chute for the same purpose. To the plow-stock $a^3$ in front of the seed chute is secured a suitable plow point shovel or other furrow opening device, while in the rear thereof and attached to the plow stock are the coverers H² arranged on either side of the seed-chute F.

When it is desired to distribute the seed together with the fertilizer the hopper may be divided into two compartments by means of a partition, it not being deemed necessary to show a hopper so divided as any old and well known form of hopper so constructed will answer the purpose. In the distribution of different kinds of seed I reserve the right to use any well known form of agitator or when desired a perforated drum in lieu thereof.

A modified form of hopper is shown in Figs. 2 and 3 of the drawings. This hopper is adapted to sow corn or peas. In the hopper H, is a slide $h$ working horizontally in the bottom thereof, the slide $h$ having an opening or recess $h'$ therein which is alternately thrown in and out of the hopper by means of a spring $h^2$ engaging the slide $h$ at one end and secured at its other end to the hopper H. This spring is actuated automatically by means of an arm $h^3$ pivoted to the hopper H and having a supplemental arm $h^4$ at one end, pivoted thereto, the supplemental arm being engaged by a series of pins $h^5$ on a sprocket wheel $h^6$ the shaft of which is journaled in the sides of the hopper. It will thus be seen that as the opening in the slide is thrown into the hopper it is filled with seed which it carries in its reverse movement to the outside thereof where the seed is dropped.

Having thus fully described my invention, what I claim as new, and desire to secure by Letters Patent, is—

1. In a convertible seed planter and fertilizer distributer, the combination of a hopper, of a pivoted shoe beneath the hopper and a seed-chute adjacent to the shoe, having a detachable corrugated plate therein, substantially as described.

2. In a convertible seed planter and fertilizer distributer, the combination of a hopper with a seed-chute having a detachable corrugated plate secured therein, substantially as described.

3. In a convertible fertilizer distributer and seed planter, the combination of the frame, of a hopper thereon, a pivoted shoe arranged beneath the hopper, a seed-chute adjacent to the hopper, an agitator within the hopper, a driving-wheel near the forward end of the frame provided with a series of ribs or flanges, suitable gearing connecting the driving-wheel with the agitator whereby motion is imparted thereto, and a knocker-iron secured at one end to the shoe and having a pivoted angle-bar at its other end which engages the ribs or flanges of the driving-wheel, substantially as described.

4. In a convertible seed planter and fertilizer distributer, the combination of the frame, with a hopper, of a shoe pivoted beneath the hopper, a seed chute arranged adjacent to the shoe, a driving-wheel journaled on the frame and having a series of ribs or flanges thereon, and a knocker-iron secured at one end to the shoe and having a pivoted angle-bar at its other end which engages the ribs or flanges on the driving wheel for imparting an oscillating movement through the knocker-iron to the pivoted shoe, while the planter moves forward, substantially as described.

5. In a convertible seed planter and fertilizer distributer, the combination of a main frame, of a supplemental frame secured thereon, of a hopper supported in said supplemental frame, capable of vertical adjustment to increase or diminish the seed supply, an agitator within the hopper, a driving-wheel, and a belt or chain connecting the agitator with the driving-wheel, the driving-wheel being adjustably secured on the main frame, to permit the loosening or tightening of the said chain or belt, substantially as and for the purpose described.

6. In a convertible seed planter and fertilizer distributer the combination of a frame, of a hopper supported thereon, capable of vertical adjustment to increase or diminish the seed supply, an agitator within the hopper, a shoe pivoted beneath the hopper, a seed chute adjacent to the shoe, having a detachable corrugated plate therein, a driving wheel, a belt or chain connecting the agitator with the driving wheel, the driving wheel being adjustably secured on the frame to permit the loosening or tightening of the chain or belt, and a connection between the driving wheel and the pivoted shoe whereby a reciprocating movement is imparted to the latter, substantially as described.

In testimony whereof I affix my signature in presence of two witnesses.

WILLIAM EVERARD HAMILTON SEARCY.

Witnesses:
C. H. JOHNSON, Jr.,
ALEX. S. MURRAY.